US011792862B2

(12) United States Patent
Taherzadeh Boroujeni et al.

(10) Patent No.: US 11,792,862 B2
(45) Date of Patent: Oct. 17, 2023

(54) MESSAGE 3 REPETITION CONDITIONED ON PRACH COVERAGE ENHANCEMENT

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/500,671

(22) Filed: Oct. 13, 2021

(65) Prior Publication Data

US 2022/0124833 A1    Apr. 21, 2022

Related U.S. Application Data

(60) Provisional application No. 63/093,002, filed on Oct. 16, 2020.

(51) Int. Cl.
*H04W 74/08* (2009.01)
*H04W 72/044* (2023.01)
*H04W 74/00* (2009.01)

(52) U.S. Cl.
CPC ..... *H04W 74/0841* (2013.01); *H04W 72/046* (2013.01); *H04W 74/008* (2013.01); *H04W 74/0866* (2013.01)

(58) Field of Classification Search
CPC ............. H04W 72/046; H04W 74/008; H04W 74/0841; H04W 74/0866
See application file for complete search history.

(56) References Cited

U.S. PATENT DOCUMENTS

| | | | |
|---|---|---|---|
| 10,863,364 B2 * | 12/2020 | Veeramallu | H04W 74/0833 |
| 2016/0100422 A1 * | 4/2016 | Papasakellariou | H04W 72/23 370/329 |
| 2016/0165640 A1 * | 6/2016 | Yang | H04W 72/21 370/336 |
| 2017/0141833 A1 * | 5/2017 | Kim | H04L 5/0057 |
| 2021/0051707 A1 * | 2/2021 | Rastegardoost | H04L 5/0051 |
| 2021/0392699 A1 * | 12/2021 | Park | H04W 74/0891 |
| 2022/0232639 A1 * | 7/2022 | Wang | H04L 1/0025 |

* cited by examiner

*Primary Examiner* — Kashif Siddiqui
(74) *Attorney, Agent, or Firm* — Arent Fox, LLP

(57) ABSTRACT

A random access procedure between a user equipment (UE) and a base station may include repetition of a random access message 3 conditioned on a property of a random access preamble to improve reception. The UE may transmit the random access preamble with coverage enhancement. The base station may detect a property of the random access preamble that indicates the coverage enhancement and determine a message 3 repetition parameter. The UE may transmit the random access message 3 with repetition based on the message 3 repetition parameter, and the base station may receive the random access message 3 based on the repetition parameter, thereby improving coverage of the random access message 3.

29 Claims, 10 Drawing Sheets

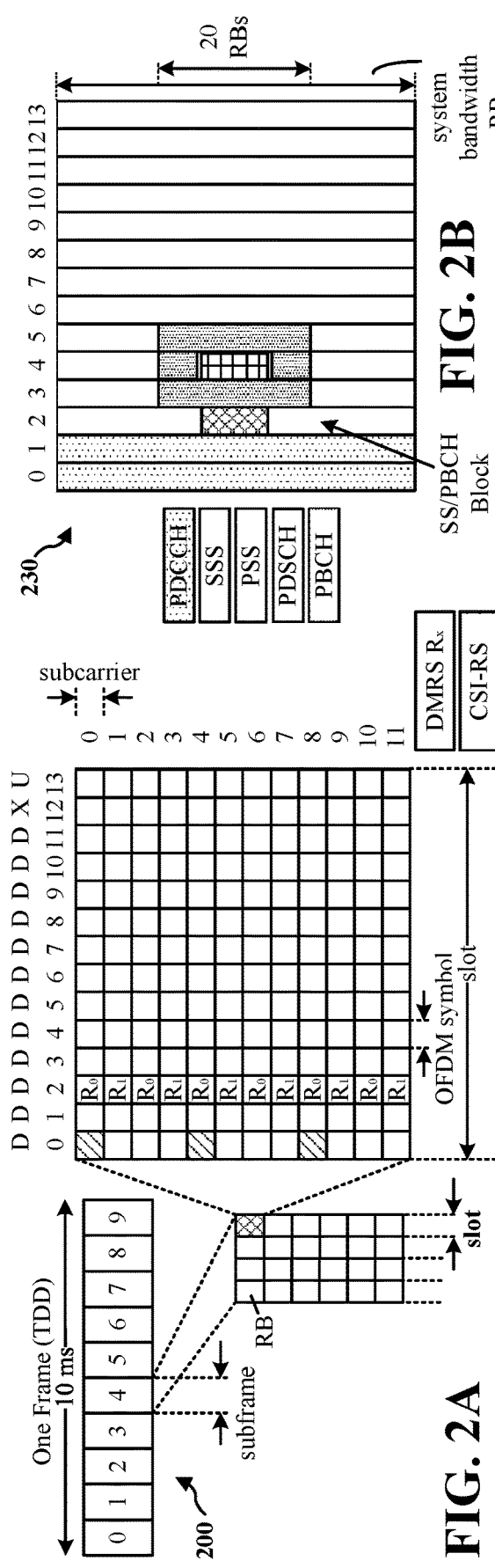
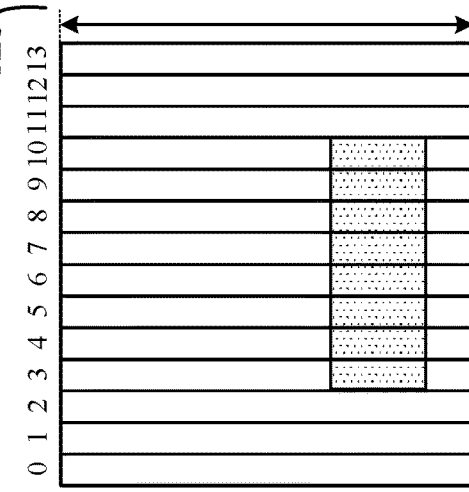
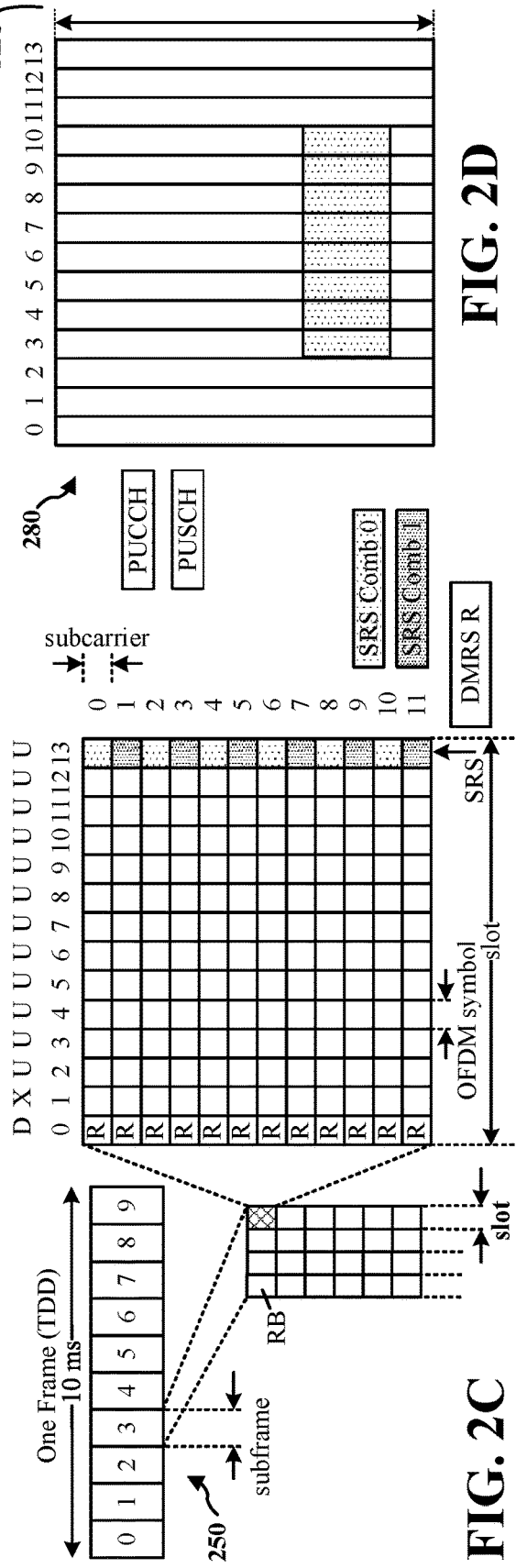
FIG. 2A
FIG. 2B
FIG. 2C
FIG. 2D

MESSAGE 3 REPETITION CONDITIONED ON PRACH COVERAGE ENHANCEMENT

CROSS REFERENCE TO RELATED APPLICATIONS

This application claims priority to U.S. Provisional Application No. 63/093,002 titled "MESSAGE 3 REPETITION CONDITIONED ON PRACH COVERAGE ENHANCEMENT," filed Oct. 16, 2020, which is assigned to the assignee hereof, and incorporated herein by reference in its entirety.

BACKGROUND

Technical Field

The present disclosure relates generally to wireless communication systems, and more particularly, to a random access procedure including message 3 repetition conditioned physical random access channel (PRACH) coverage enhancement.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication may include a random access procedure that allows a user equipment (UE) to initiate or resume communications with a base station. Under certain channel conditions, various messages of the random access procedure may not be received correctly, which may delay or prevent the UE from connecting to the base station. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communications of a user equipment (UE) are provided. The method may include transmitting a random access preamble with coverage enhancement. The method may include receiving a random access message 2. The method may include determining at least one random access message 3 repetition parameter based on at least one property of the random access preamble. The method may include transmitting a random access message 3 with repetition according to the at least one random access message 3 repetition parameter. The method may include receiving a random access message 4.

In some implementations, determining the at least one random access message 3 repetition parameter includes determining to apply repetition of the random access message 3 in response to the random access preamble being repeated.

In some implementations, determining the at least one random access message 3 repetition parameter includes determining to apply repetition of the random access message 3 based on a format of the random access preamble. For example, the format of the random access preamble may be a coverage enhanced format.

In some implementations, determining the at least one random access message 3 repetition parameter includes determining to apply repetition of the random access message 3 in response to the random access preamble including one of a configured subset of preamble sequences.

In some implementations, the method further includes receiving system information indicating that repetition of message 3 is based on the at least one property of the random access preamble.

In some implementations, the random access message 2 indicates that repetition of message 3 is based on the at least one property of the random access preamble.

In some implementations, determining the at least one random access message 3 repetition parameter includes determining a number of repetitions according to a rule. For example, the rule may be defined in system information.

In some implementations, determining the at least one random access message 3 repetition parameter includes interpreting a field of the random access message 2 as an indication of the at least one random access message 3 repetition parameter in response to transmitting the random access preamble with coverage enhancement.

In an aspect of the disclosure, a method, a computer-readable medium, and an apparatus for wireless communications of a base station are provided. The method may include receiving a random access preamble with coverage enhancement. The method may include transmitting a random access message 2. The method may include determining at least one random access message 3 repetition parameter based on at least one property of the random access preamble. The method may include receiving a random access message 3 with repetition according to the at least one random access message 3 repetition parameter. The method may include transmitting a random access message 4.

To the accomplishment of the foregoing and related ends, the one or more aspects comprise the features hereinafter fully described and particularly pointed out in the claims.

The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

DETAILED DESCRIPTION

Figure 1:
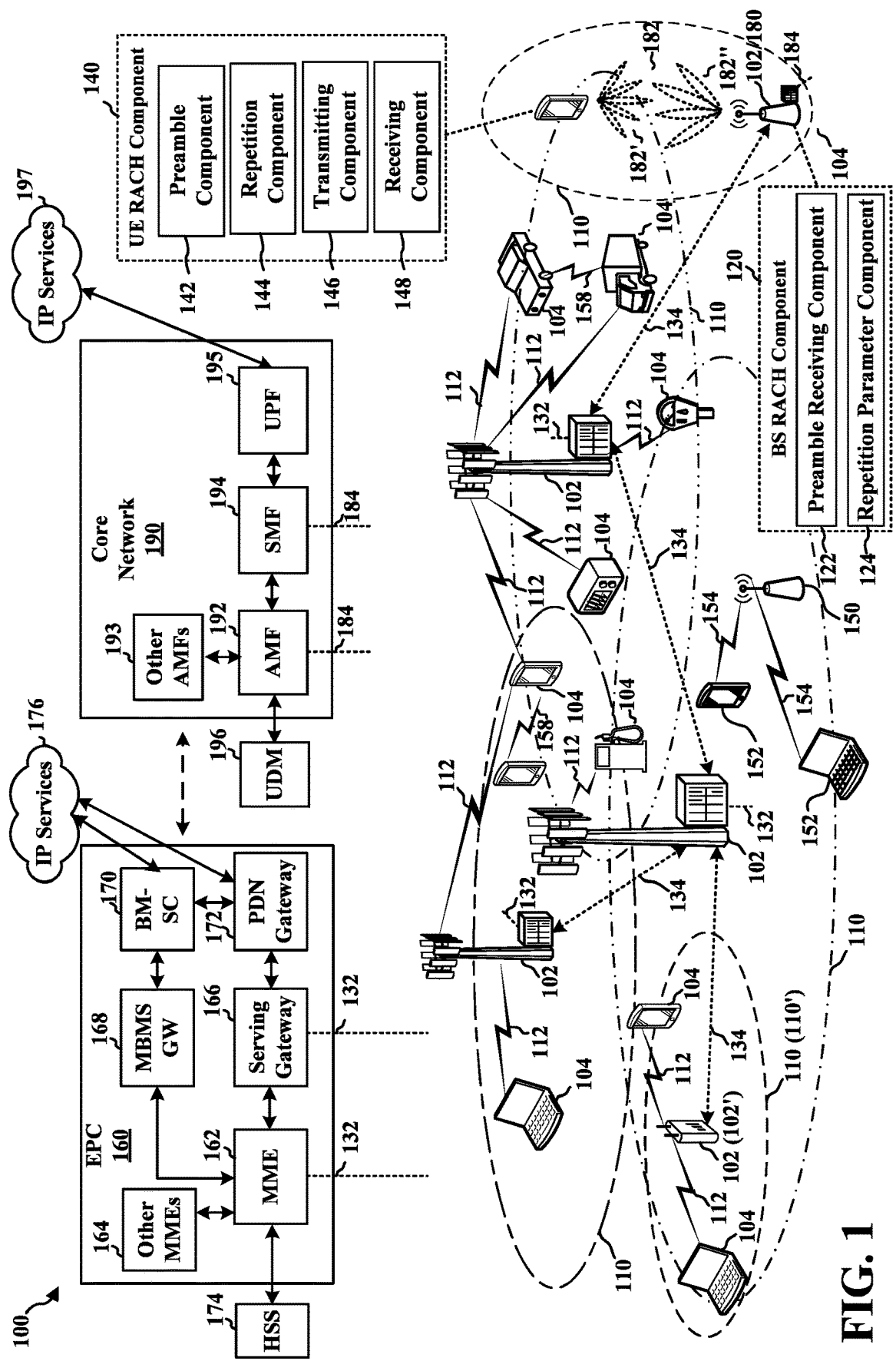
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

In a random access channel (RACH) procedure, under some channel conditions, transmitted messages may not be received correctly. In particular, when high carrier frequencies are utilized, transmissions may be subject to high path loss. Beamforming between a user equipment (UE) and a base station may overcome the path loss experienced at high carrier frequencies. During a RACH procedure, however, beamforming between the UE and the base station may not be established, for example, because the UE has been inactive prior to the RACH procedure.

The present disclosure addresses at least this problem with RACH procedures by utilizing repetition of a RACH message 3, which increases the likelihood that one or more repetitions of the message 3 will be received correctly. The repetition of the RACH message 3 may be based on a property of a RACH message 1. For example, the property may relate to coverage enhancement. Example properties may include whether the RACH message 1 is repeated, a format of the RACH message 1, or whether a particular preamble or sequence is used for the RACH message 1. The RACH message 1 may also be referred to as a PRACH or a RACH preamble. One or more RACH message 3 repetition parameters may be based on the RACH message 1. For example, the RACH message 3 repetition parameters may include: presence of repetition, type of repetition, number of repetitions, frequency offset for frequency hopping, beam index, or TCI state. The RACH message 3 repetition parameters may also include parameters for PUSCH repetition.

Particular implementations of the subject matter described in this disclosure can be implemented to realize one or more of the following potential advantages. In some implementations, the described techniques can be used to improve reliability of the RACH procedure, and thus, facilitate access to a wireless network and establish a communication connection between a UE and a base station.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more of the UEs 104 may include a UE RACH component 140 configured to perform a RACH procedure including transmitting a random access message 3. The UE RACH component 140 may include a preamble component 142 configured to transmit a random access preamble with coverage enhancement. The UE RACH component 140 may include a repetition component 144 configured to determine at least one random access message 3 repetition parameter based on at least one property of the random access preamble. The UE RACH component 140 may include a transmitting component 146 configured to transmit a random access message 3 with repetition according to the at least one random access message 3 repetition parameter. The UE RACH component 140 may include a receiving component 148 configured to receive a random access message 2 and a random access message 4.

Figure 10:
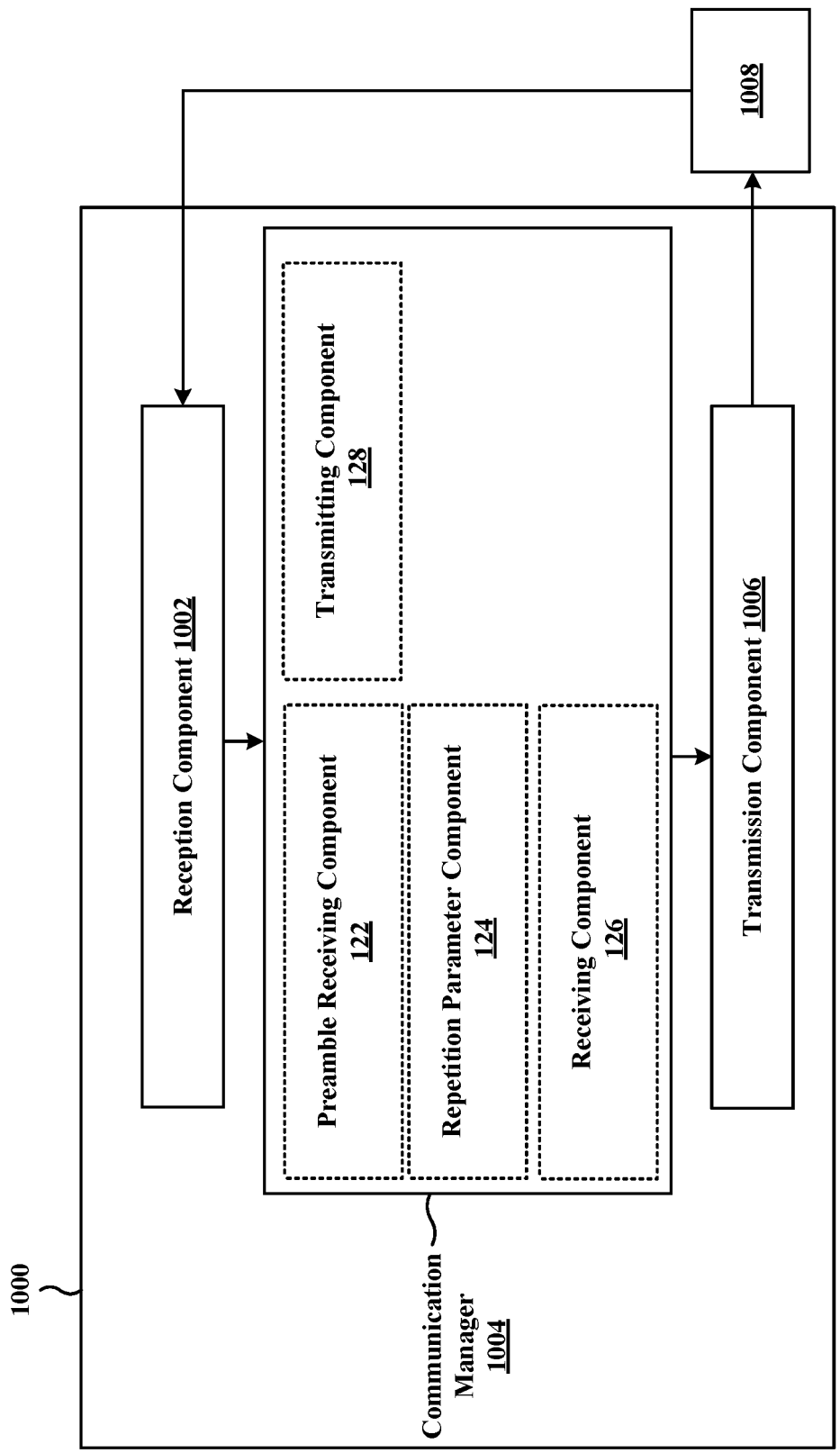
FIG. 10 is a block diagram of an example apparatus, such as a base station, for wireless communication.

In an aspect, one or more of the base stations 102 may include a base station (BS) RACH component 120 configured to receive one or more of the repetitions of the random access message 3. The BS RACH component 120 may include a preamble receiving component 122 configured to receive a random access preamble with coverage enhancement. The BS RACH component 120 may include a repetition parameter component 124 configured to determine at least one random access message 3 repetition parameter based on at least one property of the random access preamble. Additionally, as illustrated in FIG. 10, the BS RACH component 120 may include a receiving component 126 configured to receive a random access message 3 with repetition according to the at least one random access message 3 repetition parameter. The BS RACH component 120 may include a transmitting component 128 configured to transmit a random access message 2 and a random access message 4.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, and heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
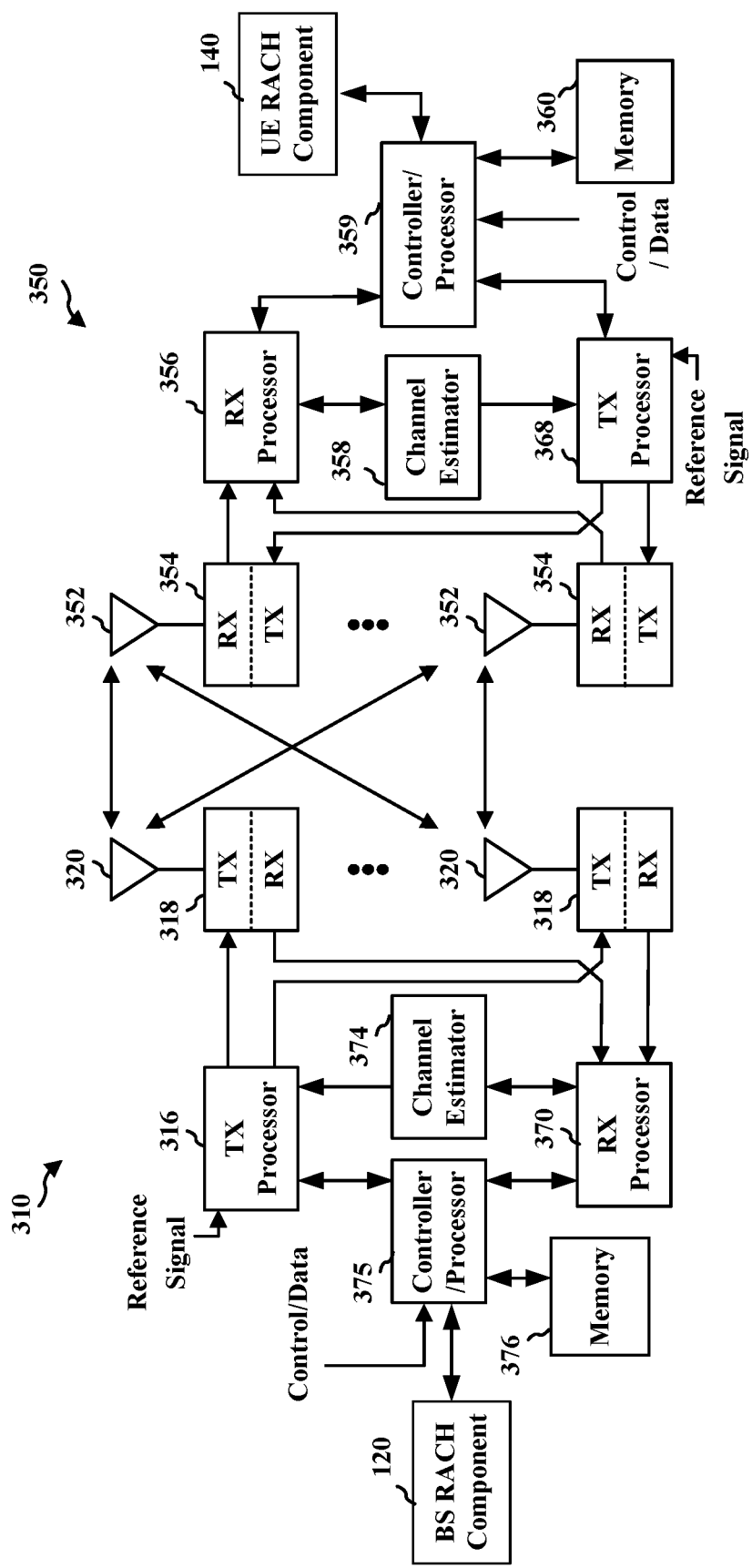
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the UE RACH component 140 of FIG. 1.

At least one of the TX processor 316, the RX processor 370, and the controller/processor 375 may be configured to perform aspects in connection with the BS RACH component 120 of FIG. 1.

Figure 4:
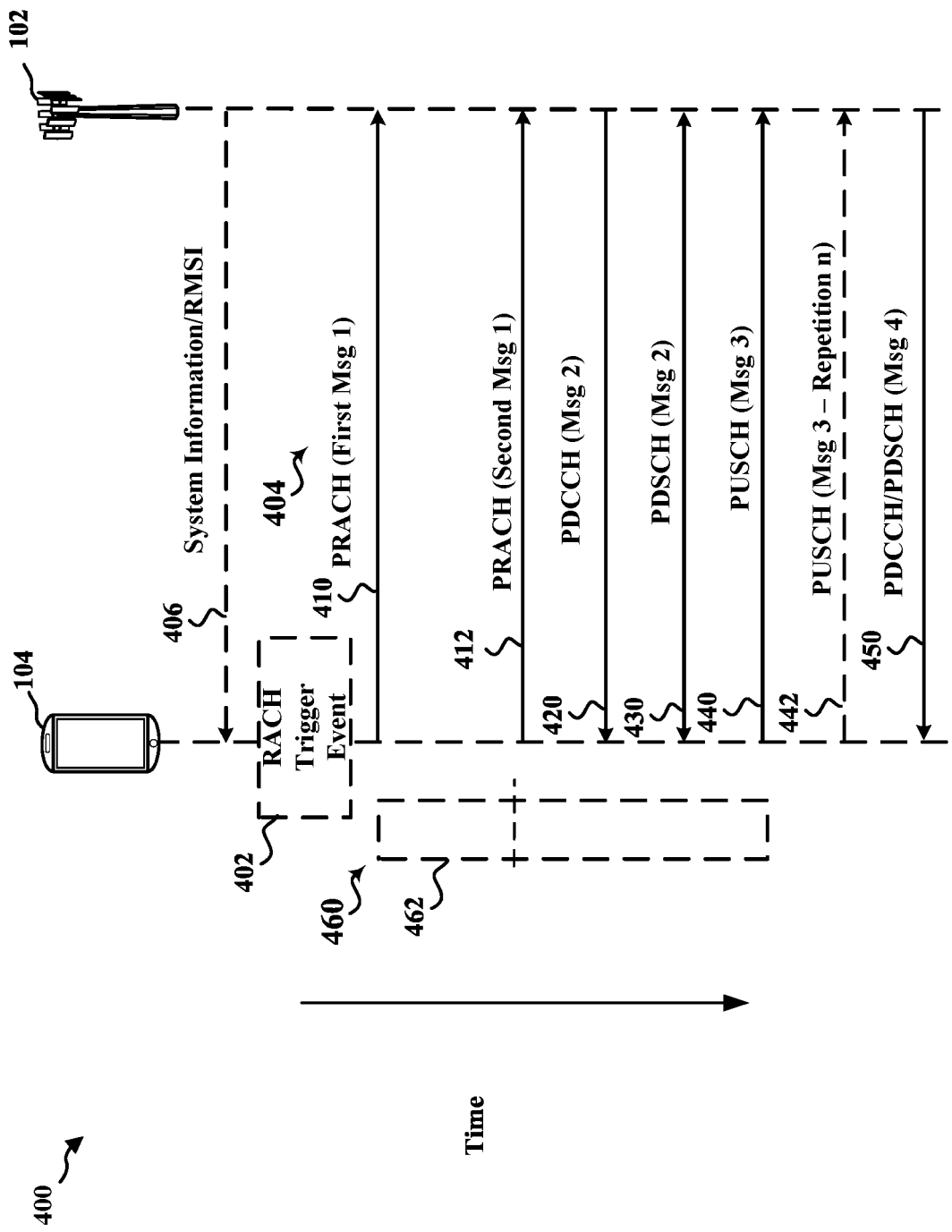
FIG. 4 is a diagram illustrating an example message exchange for a random access channel (RACH) procedure between a base station and a UE in an access network.

FIG. 4 is a diagram 400 illustrating an example message exchange for a RACH procedure 404 between a base station 102 and a UE 104 in an access network. The UE 104 may include a UE RACH component 140. In some implementations, the UE 104 may be an NR-Light UE, which may have lower capabilities or coverage than other UEs. The base station 102 may include a BS RACH component 120. Prior to the RACH procedure 404, the base station 102 may transmit system information 406 such as remaining minimum system information (RMSI) and the UE 104 may receive the system information 406. The UE 104, however, may not have established a radio resource control (RRC) connection and may not be configured with UE specific parameters.

Referring additionally to Table 1 (below), during operation, the UE 104 may execute an implementation of an NR RACH procedure 410, according to a 4-step NR RACH message flow, due to the occurrence of one or more RACH trigger events 402. Suitable examples of RACH trigger events 402 may include, but are not limited to: (i) the UE 104 performing an initial access to transition from an RRC_IDLE state to RRC_CONNECTED ACTIVE state; (ii) the UE 104 detecting downlink (DL) data arrival while in an RRC_IDLE state or RRC_CONNECTED INACTIVE state; (iii) the UE 104 determining UL data arrival from higher layers during RRC_IDLE state or RRC_CONNECTED INACTIVE state; (iv) the UE 104 performing a handover from another station to the base station 102 during the connected mode of operation; and (v) the UE performing a connection re-establishment procedure such as a beam failure recovery procedure.

The NR RACH procedure 404 may be associated with a contention-based random access procedure, or with a contention-free random access procedure. In an implementation, a contention-based NR RACH procedure corresponds to the following RACH trigger events 402: an initial access from RRC_IDLE to RRC_CONNECTED ACTIVE; UL data arrival during RRC_IDLE or RRC_CONNECTED INACTIVE; and a connection re-establishment. In an implementation, a contention-free NR RACH procedure corresponds to the following RACH trigger events 402: downlink (DL) data arrival during RRC_IDLE or RRC_CONNECTED INACTIVE; and, a handover during the connected mode of operation.

On the occurrence of any of the above RACH trigger events 402, the execution of the NR RACH procedure 404 may include the 4-step NR RACH message flow (see FIG. 4 and Table 1), where UE 104 exchanges messages with one or more base stations 102 to gain access to a wireless network and establish a communication connection. The messages may be referred to as random access messages 1 to 4, RACH messages 1 to 4, or may alternatively be referred to by the PHY channel carrying the message, for example, message 3 PUSCH.

TABLE 1

NR RACH procedure, including Messages and Message Content transmitted over corresponding Physical (PHY) channel(s).

| PHY Channel | Message | Message content |
|---|---|---|
| PRACH | Msg 1 | RACH Preamble |
| PDCCH/ PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/ PDSCH | Msg 4 | Contention resolution message |

In a first step of a first RACH procedure, for example, UE 104 may transmit a first message (Msg 1) 410, which may be referred to as a random access request message, to one or more base stations 102 via a physical channel, such as a physical random access channel (PRACH). For example, Msg 1 410 may include one or more of a RACH preamble and a resource requirement. The UE 104 may transmit the Msg 1 on a random access opportunity (RO). In an aspect, the RACH preamble may be a relatively long preamble sequence, which may be easier for the base station 102 to receive than an OFDM symbol. In an aspect, the UE random access component 140 may select a beam for transmission of the Msg 1 410 based on received synchronization signal blocks (SSBs) transmitted by the base station 102.

In a second step, the base station 102 may respond to Msg 1 410 by transmitting a second message (Msg 2), which may be referred to as a random access response (RAR) message. The RAR message may include a physical downlink control channel (PDCCH) portion 420 and a physical downlink shared channel (PDSCH) portion 430. In an aspect, the UE random access component 140 may monitor the PDCCH during a first RAR window 460 based on the Msg 1 410 to detect a PDCCH portion 420 of the first RAR message as a DCI format 1_0 with a CRC scrambled by a RA-RNTI corresponding to the Msg 1 410 and receive the PDSCH portion 430 of the RAR message as a transport block in a corresponding PDSCH within the RAR window 460. The receiving component 148 may pass the transport block to higher layers, which may parse the transport block for a random access preamble identity (RAPID) associated with the Msg 1 410. If the higher layers identify the RAPID in the transport block, the higher layers indicate an uplink grant to the UE RACH component 140 at the physical layer. This is referred to as RAR UL grant in the physical layer. For example, Msg 2 may include one or more of a detected preamble identifier (ID), a timing advance (TA) value, a temporary cell radio network temporary identifier (TC-RNTI), a backoff indicator, or an UL grant.

In an aspect, to improve coverage of the PRACH and/or the Msg 3, an enhanced coverage RACH procedure may be used. For example, the UE 104 may transmit a second Msg 1 412 on the PRACH. For instance, the UE 104 may transmit the second Msg 1 412 in response to determining that the PDCCH portion 420 of the first RAR message is not received during a first portion 462 of the first RAR window 460. That is, the UE 104 may be configured to start a second, concurrent, enhanced coverage RACH procedure when such a procedure may be helpful to improve likelihood of reception. In some implementations, the UE 104 may transmit the second Msg 1 412 in response to a measurement by the UE 104 (e.g., if SSB-based RSRP is less than a certain threshold). The UE 104 may use a coverage-enhanced transmission method for the second Msg 1 412. For instance, the UE 104 may repeat transmission of the second Msg 1 412 on different ROs. As another example, the second Msg 1 412 may follow a pattern to request coverage enhancement. For example, the UE 104 may indicate a request for coverage enhancement based on one or a combination of: time resources of the Msg 1, format of the Msg 1, or a sequence of the Msg 1. For example, a subset of the available PRACH sequences may be associated with coverage enhancement. The subset may include fewer than a total number of the available PRACH sequences.

In response to receiving the Msg 2 PDSCH portion 430, the UE 104 transmits to the base station 102 a third message (Msg 3) 440, which may be an RRC connection request or a scheduling request, via a physical uplink channel such as PUSCH based on the RAR UL grant provided in Msg 2 of the base station 102. In an aspect, a UE that is experiencing conditions that may result in poor reception of the Msg 3 by a base station 102 may use repetitions to enhance reception of the Msg 3 and further RACH messages by the base station 102. For example, if the UE is an NR-Light UE that has relatively low transmission power, repetition of the Msg 3 may improve reception of the Msg 3 at the base station 102. Other conditions that may result in poor reception of the Msg 3 may include the use of high frequencies (such as carriers in the mmWave band), an obstructed line of sight, or interference. In an aspect, one or more parameters of Msg 3 repetition may be based on a property of the random access preamble. That is, the UE 104 may transmit Msg 3 with repetition based on whether the Msg 1 410 or 412 was repeated or based on one or a combination of: time resources of the Msg 1, format of the Msg 1, or a sequence of the Msg 1. Similarly, the base station 102 may determine that the Msg 3 is repeated in response to the Msg1 being configured with coverage enhancement. Both the UE 104 and the base station 102 may determine at least one Msg 3 repetition parameter based on the Msg 1.

The UE 104 may transmit up to n repetitions 442 of Msg 3. In an aspect, each repetition 442 may utilize a different beam. The beams may be sub-beams of a previously determined beam. Accordingly, the beams may refine the previously determined beam and one or more of the beams may be received with greater power or quality. In an aspect, the BS RACH component 120 may determine whether the UE 104 is to repeat the Msg 3 440 based on at least one property of the Msg 1. For example, the BS RACH component 120 may determine whether the UE 104 is to repeat the Msg 3 440 based on whether the Msg 1 is configured with coverage enhancement.

In response to receiving Msg 3 440 and/or one of the Msg 3 repetitions 442, the base station 102 may transmit a fourth message (Msg 4) 450, which may be referred to as a contention resolution message, to UE 104 via a PDCCH and a PDSCH. For example, Msg 4 may include a cell radio network temporary identifier (C-RNTI) for UE 104 to use in subsequent communications. In an aspect, the base station 102 may select a beam for transmission of the Msg 4 based on which repetition 442 of the Msg 3 is the strongest.

In some example scenarios, a collision between two or more UEs 104 requesting access can occur. For instance, two or more UEs 104 may send Msg 1 having a same RACH preamble because the number of RACH preambles may be limited and may be randomly selected by each UE 104 in a contention-based NR RACH procedure. Such UEs transmitting the same RACH preamble may be referred to as colliding UEs. As such, each colliding UE 104 that selects the same RACH preamble will receive the same temporary C-RNTI and the same UL grant, and thus each colliding UE 104 may send a similar Msg 3. In this case, base station 102 may resolve the collision in one or more ways. In a first scenario, a respective Msg 3 from each colliding UE 104 may interfere with the other Msg 3, so base station 102 may not send Msg 4. Then each UE 104 will retransmit Msg 1 with a different RACH preamble. In a second scenario, base station 102 may successfully decode only one Msg 3 and send an ACK message to the UE 104 corresponding to the successfully decoded Msg 3. In a third scenario, base station 102 may successfully decode the Msg 3 from each colliding UE 104, and then send a Msg 4 having a contention resolution identifier (such as an identifier tied to one of the UEs) to each of the colliding UEs. Each colliding UE 104 receives the Msg 4, decodes the Msg 4, and determines if the UE 104 is the correct UE by successfully matching or identifying the contention resolution identifier. Such a problem may not occur in a contention-free NR RACH procedure, as in that case, base station 102 may inform UE 104 of which RACH preamble to use.

Figure 5:
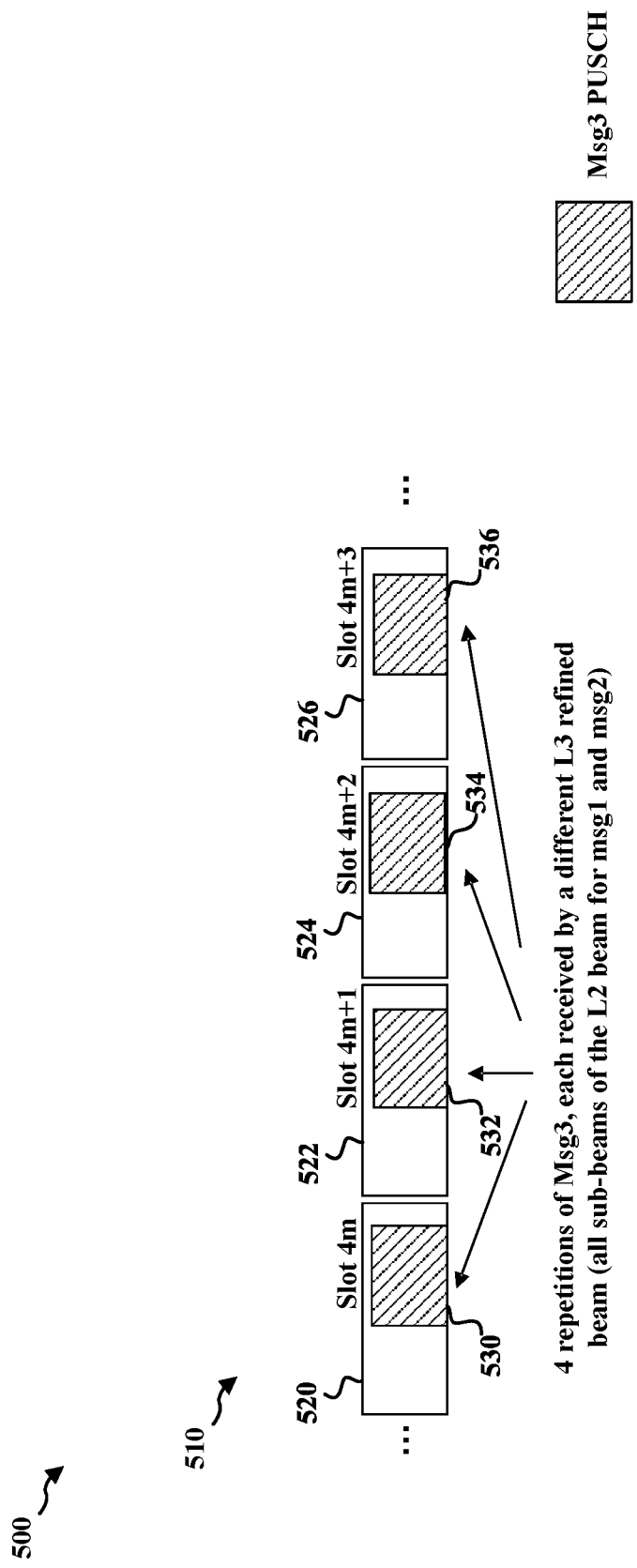
FIG. 5 is a diagram illustrating example resources for repetition of a random access message 3.

FIG. 5 is a diagram 500 illustrating example resources for repetition of a random access message 3. The resources 510 may be located within consecutive slots 520, 522, 524, and 526. The UE 104 may transmit a repetition 530, 532, 534, 536 of the Msg 3 in each slot 520, 522, 524, and 526. That is, each repetition 530, 532, 534, and 536 may include the same data. The base station 102 may utilize different refined sub-beams to receive each repetition 530, 532, 534, and 536 in the respective slot 520, 522, 524, and 526. A refined sub-beam may refer to a lower level beam in a hierarchical set of beams. For example, a layer 1 (L1) beam may cover multiple L2 beams, which may each cover multiple L3 beams. In an implementation, the beams corresponding to Msg 1 and Msg 2 are L2 beams and each of the different refined sub-beams beams is an L3 beam. The L3 refined beams may be based on an L2 beam used for the Msg 1 and the Msg 2. That is, the base station 102 may generate different sub-beams of the L2 beam to attempt to improve reception of the Msg 3.

In an aspect, the base station 102 may select one of the received repetitions 530, 532, 534, and 536 based on one or more criteria. For example, the base station 102 may determine which one of the received repetitions 530, 532, 534, and 536 is the strongest and select that repetition. In a first implementation, the base station 102 may detect each repetition of the Msg 3 separately using a corresponding refined beam for each repetition. That is, the base station 102 may receive a signal for each repetition 530, 532, 534, and 536 using a respective refined beam and attempt to decode the Msg 3 based on only the signal received with the respective refined beam. The base station 102 may determine a signal power such as a received signal strength indicator (RSSI) for each repetition 530, 532, 534, and 536.

In a second implementation, the base station 102 may improve the likelihood of detection by soft combining the signals received via each of the different refined beams. That is, the base station 102 may soft combine the received signals for the repetitions 530, 532, 534, and 536 to determine the Msg 3. The base station 102 may then determine a reference signal received power (RSRP) for each repetition 530, 532, 534, and 536 based on the Msg 3. For example, the base station 102 may use the decoded Msg 3 as a reference signal and compare each repetition 530, 532, 534, and 536 to the reference signal. Accordingly, the RSRP may indicate a quality of each reference signal. In either the first implementation or the second implementation, the base station 102 may select a beam corresponding to one of the repetitions 530, 532, 534, and 536 (for example, the repetition having the strongest RSSI or RSRP) to use for the Msg 4.

In an aspect, the UE 104 may interpret the Msg 2 based on the at least one property of the random access preamble to indicate repetition parameters. For example, when the random access preamble indicates repetition, the UE may interpret a field of the Msg 2 PDCCH portion 420 or the Msg 2 PDSCH portion 430 as an indication of the number of repetitions to use or an indication of the associated resources for repetition. For example, the resources may utilize frequency hopping to improve diversity. The Msg 2 PDSCH may indicate a frequency hopping pattern or specific frequency-domain resources.

Figure 6:
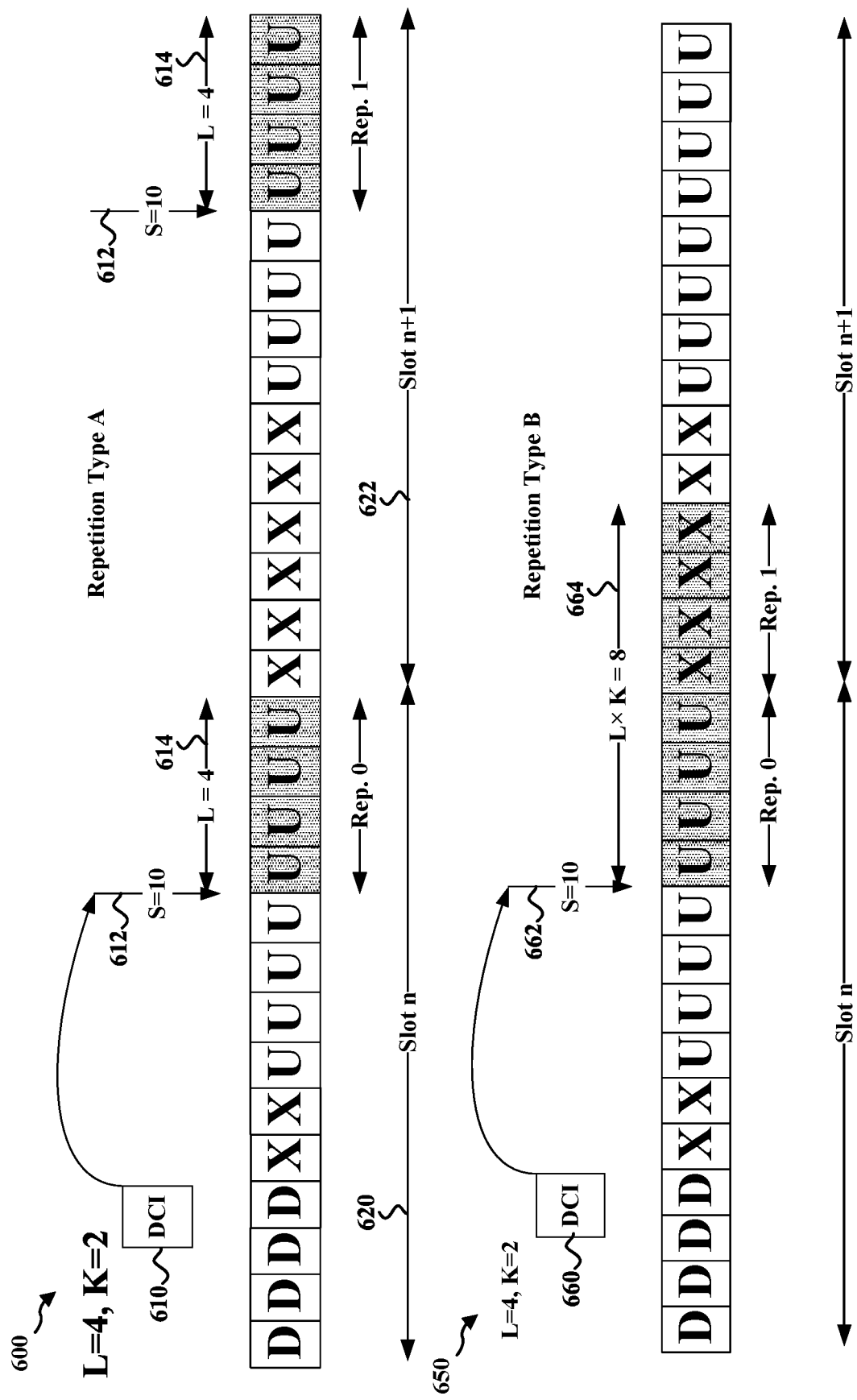
FIG. 6 is a diagram illustrating examples of a first repetition type and a second repetition type.

FIG. 6 is a diagram illustrating a first repetition type 600 and a second repetition type 650. The UE 104 may repeat transmission of the Msg 3 using either of the first repetition type 600 or the second repetition type 650.

The first repetition type 600 may be referred to as repetition type A. In repetition type A, a number of repetitions (K) may be applied across K consecutive slots. A DCI 610 may include a start and length indicator (SLIV) that indicates a start symbol (S) 612 and a length (L) 614 of a first transmission in a first slot 622. The DCI 610 may also specify frequency domain resources. A PUSCH transmission may utilize the frequency domain resources in the symbols of the first slot 620 defined by the SLIV. A PUSCH repetition may utilize the same frequency domain resources in the same symbols of the consecutive slot 622.

The second repetition type 650 may be referred to as repetition type B. In repetition type B, repetitions may occur within or across slots. In general, for repetition type B, a number (K) of nominal repetitions, each with nominal length (L) are sent back-to-back starting from symbol S 662 for a number of symbols L×K 664. S and L are determined based on the SLIV. A repetition may cross a slot boundary. Additionally, the number of repetitions may be dynamically indicated in the DCI 660. The repetitions may hop across frequencies. A repetition may be indicated to use a symbol designated for downlink. Such symbols may be considered invalid for PUSCH. For PUSCH repetition type B, after determining the invalid symbol(s), the remaining symbols may be considered as potentially valid symbols for PUSCH repetition type B transmission. If the number of potentially valid symbols for PUSCH repetition type B transmission is greater than zero for a nominal repetition, the nominal repetition consists of one or more actual repetitions, where each actual repetition consists of a consecutive set of all potentially valid symbols that can be used for PUSCH repetition type B transmission within a slot. An actual repetition with a single symbol is omitted except for the case of L=1. The SLIV format for repetition type B may be different than for repetition type A.

In some implementations, the UE 104 and/or the base station 102 may determine one or more Msg 3 repetition parameters for the first repetition type 600 or the second repetition type 650 based on the random access preamble. For example, in some implementations, the RMSI may include repetition parameters for the first repetition type 600 and/or the second repetition type 650. For instance, the RMSI may define K. The UE 104 and/or the base station 102 may select a repetition type and/or a set of repetition parameters based on the random access preamble. For example, a sequence of the random access preamble may indicate a repetition type. In another implementation, the base station 102 may set a field of the Msg 2 to indicate a repetition type or a parameter therefor based on the random access preamble indicating repetition of message 3.

Figure 7:
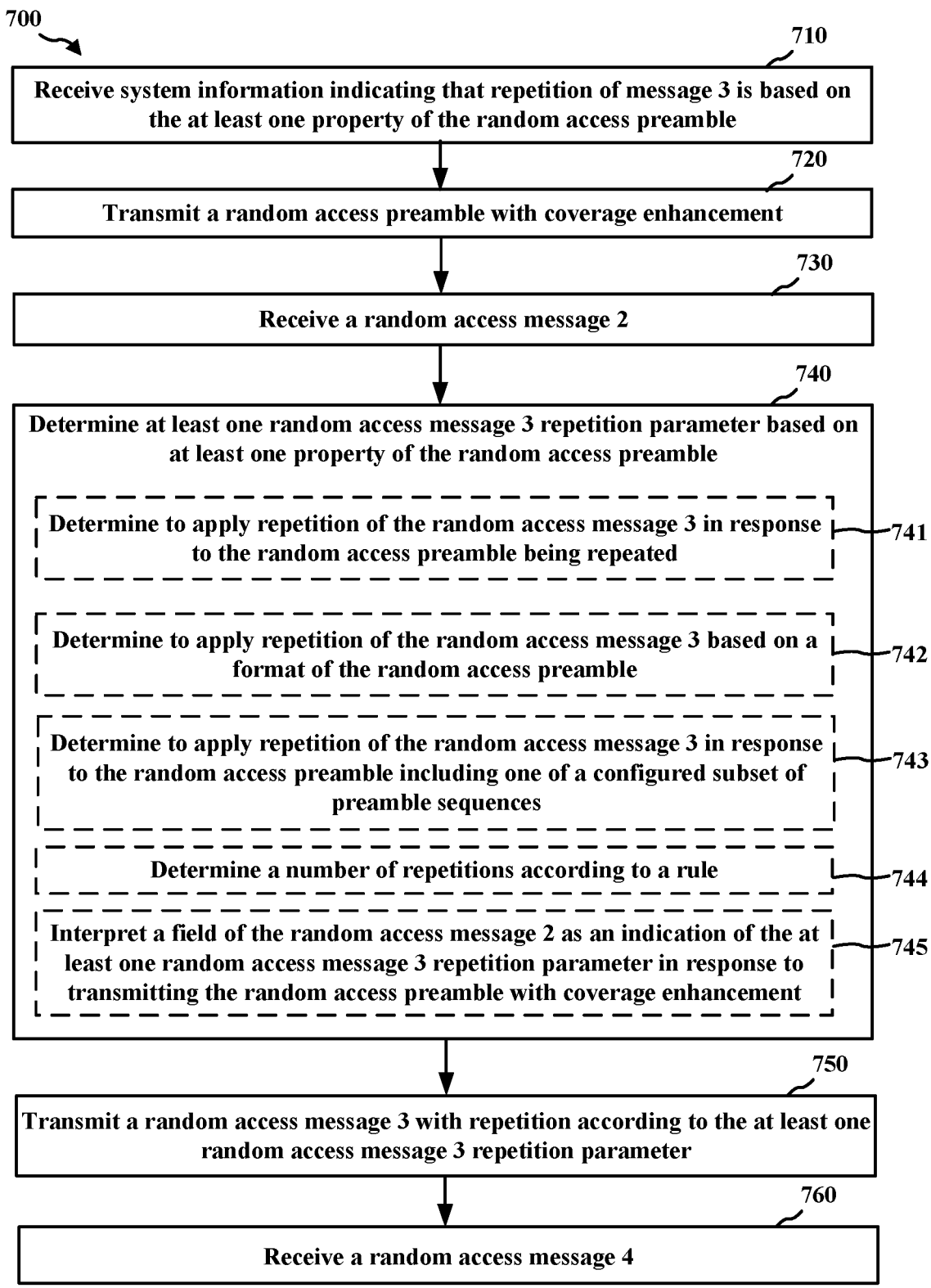
FIG. 7 is a flowchart of an example method for transmitting a random access message 3 during a RACH procedure.

FIG. 7 is a flowchart of an example method 700 for transmitting a random access message 3 during a RACH procedure. The method 700 may be performed by a UE (such as the UE 104, which may include the memory 360 and which may be the entire UE 104 or a component of the UE 104 such as the UE RACH component 140, TX processor 368, the RX processor 356, or the controller/processor 359). The method 700 may be performed by the UE RACH component 140 in communication with the BS RACH component 120 of the base station 102.

In block 710, the method 700 may optionally include receiving system information indicating that repetition of message 3 is based on the at least one property of the random access preamble. In an aspect, for example, the UE 104, the RX processor 356 or the controller/processor 359 may execute the UE RACH component 140 or the receiving component 148 to receive system information indicating that repetition of message 3 is based on the at least one property of the random access preamble. For example, the system information may be remaining minimum system information (RMSI). The RMSI may include one or more random access message 3 repetition parameters to use in response to determining to apply repetition. Accordingly, the UE 104, RX processor 356, or the controller/processor 359 executing the UE RACH component 140 or the receiving component 148 may provide means for receiving system information indicating that repetition of message 3 is based on the at least one property of the random access preamble.

In block 720, the method 700 may include transmitting a random access preamble with coverage enhancement. In an aspect, for example, the UE 104, the TX processor 368 or the controller/processor 359 may execute the UE RACH component 140 or the preamble component 142 to transmit a random access preamble (e.g., Msg1 412) with coverage enhancement. For example, UE 104 may use a coverage-enhanced transmission method for the Msg 1 410 or 412. For instance, the UE 104 may repeat transmission of the Msg 1 410 on different ROs. As another example, the Msg 1 410 may follow a pattern to request coverage enhancement. For example, the UE 104 may indicate a request for coverage enhancement based on one or a combination of: time resources of the Msg 1, format of the Msg 1, or a sequence of the Msg 1. For example, a subset of the available PRACH sequences may be associated with coverage enhancement. Accordingly, the UE 104, TX processor 368, or the controller/processor 359 executing the UE RACH component 140 or the preamble component 142 may provide means for transmitting a random access preamble with coverage enhancement.

In block 730, the method 700 may include receiving a random access message 2. In an aspect, for example, the UE 104, the RX processor 356 or the controller/processor 359 may execute the UE RACH component 140 or the receiving component 148 to receive the Msg2 PDCCH portion 420 and the Msg2 PDSCH portion 430. For example, the receiving component 148 may receive the PDCCH portion 420 of the random access message 2, determine that a cyclic redundancy check (CRC) of a DCI on the PDCCH is scrambled with a RA-RNTI, determine a corresponding PDSCH transport block, pass the transport block to higher layers, and receive the PDSCH portion of the random access message 2 from the higher layers. In an aspect, the random access message 2 may indicate a number repetitions in a PDCCH portion. For example, the receiving component 148 may interpret a field of the Msg 2 PDCCH portion 420 to indicate the number of repetitions. In another aspect, the random access message 2 indicates the multiple repetitions in a PDSCH portion. For instance, the Msg 2 PDSCH portion 430 may indicate the number of repetitions or resources for the repetitions. Accordingly, the UE 104, RX processor 356, or the controller/processor 359 executing the UE RACH component 140 or the receiving component 148 may provide means for receiving a random access message 2.

In block 740, the method 700 may include determining at least one random access message 3 repetition parameter based on at least one property of the random access preamble. In an aspect, for example, the UE 104, the TX processor 368 or the controller/processor 359 may execute the UE RACH component 140 or the repetition component 144 to determine at least one random access message 3 repetition parameter based on at least one property of the random access preamble. For example, in sub-block 741, the repetition component 144 may determine to apply repetition of the random access message 3 in response to the random access preamble being repeated. As another example in sub-block 742, the repetition component 144 may determine to apply repetition of the random access message 3 based on a format of the random access preamble. As another example in sub-block 743, the repetition component 144 may determine to apply repetition of the random access message 3 in response to the random access preamble including one of a configured subset of preamble sequences. As another example in sub-block 744, the repetition component 144 may determine a number of repetitions according to a rule. For instance, the rule may be defined in system information (e.g., RMSI). As another example, in sub-block 745, the repetition component 144 may interpret a field of the random access message 2 as an indication of the at least one random access message 3 repetition parameter in response to transmitting the random access preamble with coverage enhancement. Accordingly, the UE 104, TX processor 368, or the controller/processor 359 executing the UE RACH component 140 or the repetition component 144 may provide means for determining at least one random access message 3 repetition parameter based on at least one property of the random access preamble.

In block 750, the method 700 may include transmitting a random access message 3 with repetition according to the at least one random access message 3 repetition parameter. In an aspect, for example, the UE 104, the controller/processor 359, or the TX processor 368 may execute the UE RACH component 140 or the transmitting component 146 to transmit the random access message 3 with repetition according to the at least one random access message 3 repetition parameter. For example, the transmitting component 146 may repeat the message 3 based on the number of repetitions. For instance, the transmitting component 146 may follow either PUSCH repetition type A or PUSCH repetition type B based on the number of repetitions (K). In some implementations, transmitting the random access message 3 for the number of repetitions may include transmitting the repetitions using a frequency hopping pattern. Accordingly, the UE 104, TX processor 368 or the controller/processor 359 executing the UE RACH component 140 or the repetition component 144 may provide means for transmitting a random access message 3 with repetition according to the at least one random access message 3 repetition parameter.

In block 760, the method 700 may include receiving a random access message 4. In an aspect, for example, the UE 104, the RX processor 356 or the controller/processor 359 may execute the UE RACH component 140 or the receiving component 148 to receive a random access message 4 (e.g., Msg4 450). Accordingly, the UE 104, the RX processor 356, or the controller/processor 359 executing the UE RACH component 140 or the receiving component 148 may provide means for receiving a random access message 4.

Figure 8:
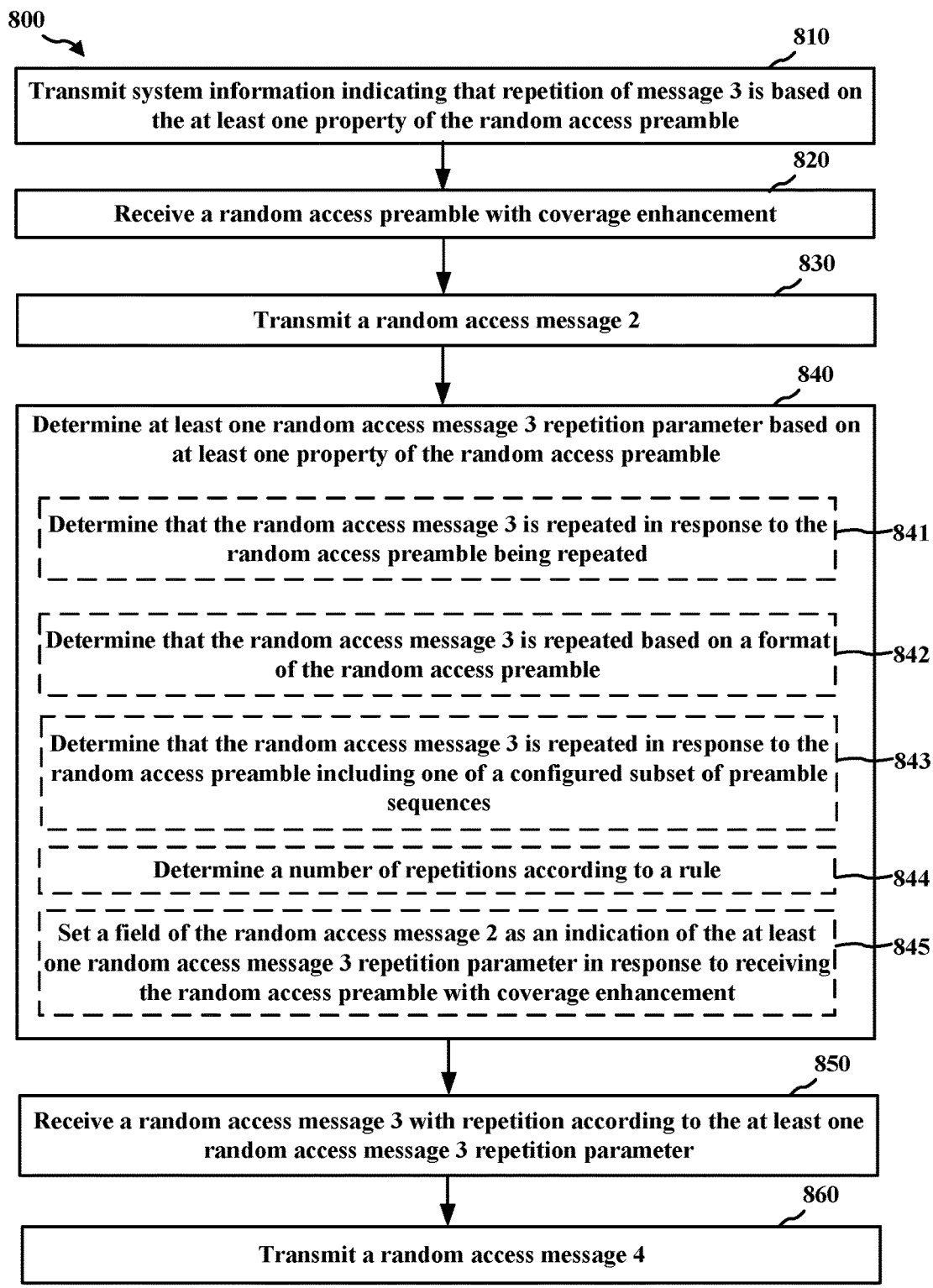
FIG. 8 is a flowchart of an example method for receiving a random access message 3 during a RACH procedure.

FIG. 8 is a flowchart of an example method 800 for receiving a random access message 3 during a RACH procedure. The method 800 may be performed by a base station (such as the base station 102, which may include the memory 376 and which may be the entire base station 102 or a component of the base station 102 such as the BS RACH component 120, TX processor 316, the RX processor 370, or the controller/processor 375). The method 800 may be performed by the BS RACH component 120 in communication with the UE RACH component 140 of the UE 104.

In block 810, the method 800 may optionally include transmitting system information indicating that repetition of message 3 is based on the at least one property of the random access preamble. In an aspect, for example, the base station 102, the TX processor 316, or the controller/processor 375 may execute the BS RACH component 120 or the transmitting component 128 to transmit the system information (e.g., RMSI) indicating that repetition of message 3 is based on the at least one property of the random access preamble. Accordingly, the base station 102, the TX processor 316, or the controller/processor 375 executing the BS RACH component 120 or the transmitting component 128 may provide means for transmitting system information indicating that repetition of message 3 is based on the at least one property of the random access preamble.

In block 820, the method 800 may include receiving a random access preamble with coverage enhancement. In an aspect, for example, the base station 102, the RX processor 370, or the controller/processor 375 may execute the BS RACH component 120 or the preamble receiving component 122 to receive the random access preamble (e.g., Msg 1 410 or 412) with coverage enhancement. For instance, example properties of the random access preamble that indicate coverage enhancement may include whether the RACH message 1 is repeated, a format of the RACH message 1, or whether a particular preamble or sequence is used for the RACH message 1. Accordingly, the base station 102, the RX processor 370, or the controller/processor 375 executing the BS RACH component 120 or the preamble receiving component 122 may provide means for receiving a random access preamble with coverage enhancement.

In block 830, the method 800 may include transmitting a random access message 2. In an aspect, for example, the base station 102, the TX processor 316, or the controller/processor 375 may execute the BS RACH component 120 or the transmitting component 128 to transmit a random access message 2. In some implementations, the random access message 2 may include a field that is set based on a random access message 3 repetition parameter. Accordingly, the base station 102, the TX processor 316, or the controller/processor 375 executing the BS RACH component 120 or the transmitting component 128 may provide means for transmitting a random access message 2.

In block 840, the method 800 may include determining at least one random access message 3 repetition parameter based on at least one property of the random access preamble. In an aspect, for example, the base station 102, the RX processor 370, or the controller/processor 375 may execute the BS RACH component 120 or the repetition parameter component 124 to determine at least one random access message 3 repetition parameter based on at least one property of the random access preamble. In an aspect, receiving the random access message 3 for the number of repetitions may include receiving the repetitions using a frequency hopping pattern. For example, in sub-block 841, the repetition parameter component 124 may determine that the random access message 3 is repeated in response to the random access preamble being repeated. As another example in sub-block 842, the repetition parameter component 124 may determine that the random access message 3 is repeated based on a format of the random access preamble. As another example in sub-block 843, the repetition parameter component 124 may determine that the random access message 3 is repeated based on a format of the random access preamble. As another example in sub-block 844, the repetition parameter component 124 may determine a number of repetitions according to a rule. For instance, the rule may be defined in system information (e.g., RMSI). As another example, in sub-block 845, the repetition parameter component 124 may set a field of the random access message 2 as an indication of the at least one random access message 3 repetition parameter in response to receiving the random access preamble with coverage enhancement. Accordingly, the base station 102, the RX processor 370, or the controller/processor 375 executing the BS RACH component 120 or the repetition parameter component 124 may provide means for determining at least one random access message 3 repetition parameter based on at least one property of the random access preamble.

In block 850, the method 800 may include receiving a random access message 3 with repetition according to the at least one random access message 3 repetition parameter. In an aspect, for example, the base station 102, the RX processor 370, or the controller/processor 375 may execute the BS RACH component 120 or the receiving component 126 to receive a random access message 3 with repetition according to the at least one random access message 3 repetition parameter. In an aspect, receiving the random access message 3 for the number of repetitions may include receiving the repetitions using a frequency hopping pattern. Accordingly, the base station 102, the RX processor 370, or the controller/processor 375 executing the BS RACH component 120 or the receiving component 126 may provide means for receiving a random access message 3 with repetition according to the at least one random access message 3 repetition parameter.

In block 860, the method 800 may include transmitting a random access message 4. In an aspect, for example, the base station 102, the TX processor 316, or the controller/processor 375 may execute the BS RACH component 120 or the transmitting component 128 to transmit a random access message 4. In some implementations, the random access message 4 may be transmitted on a beam selected based on the received random access message 3 repetition. Accordingly, the base station 102, the TX processor 316, or the controller/processor 375 executing the BS RACH component 120 or the transmitting component 128 may provide means for transmitting a random access message 4.

Figure 9:
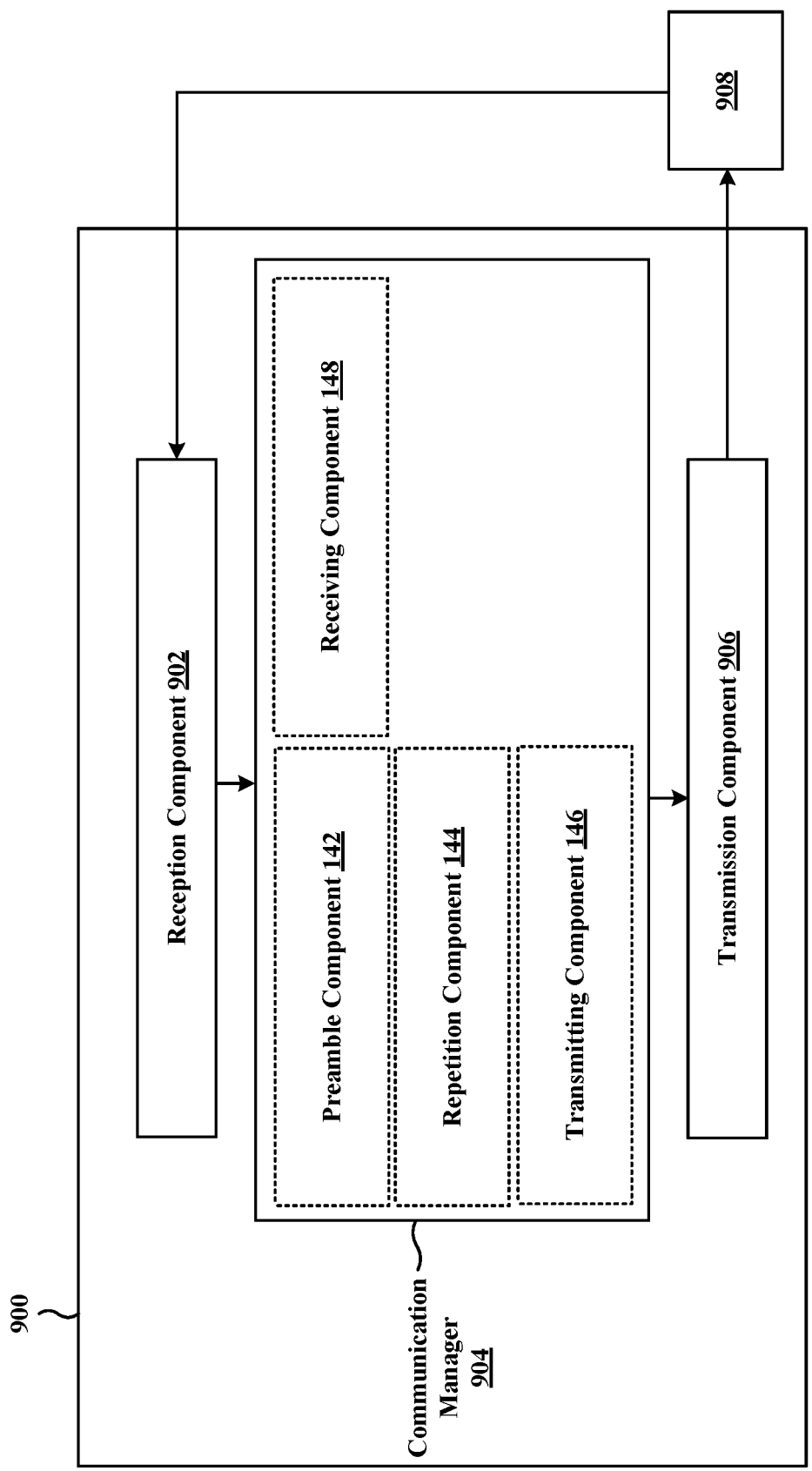
FIG. 9 is a block diagram of an example apparatus, such as a UE, for wireless communication.

FIG. 9 is a block diagram of an example apparatus 900 for wireless communication. The apparatus 900 may be a UE or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 4-6. Additionally or alternatively, the apparatus 900 may be configured to perform one or more processes described herein, such as method 700 of FIG. 7. In some aspects, the apparatus 900 may include one or more components of the UE described above in connection with FIG. 1.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 1.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 1. In some aspects, the transmission component 906 may be collocated with the reception component 902 in a transceiver.

The communication manager 904 may transmit a random access preamble with coverage enhancement; receive a random access message 2; determine at least one random access message 3 repetition parameter based on at least one property of the random access preamble; transmit a random access message 3 with repetition according to the at least one random access message 3 repetition parameter; and receive a random access message 4. In some aspects, the communication manager 904 may include a controller/processor, a memory, or a combination thereof, of the UE described above in connection with FIG. 1.

In some aspects, the communication manager 904 may include a set of components, such as a preamble component 142, a repetition component 144, a transmitting component 146, a receiving component 148 or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The preamble component 142 may transmit a random access preamble with coverage enhancement. The repetition component 144 may determine at least one random access message 3 repetition parameter based on at least one property of the random access preamble. The transmitting component 146 may transmit a random access message 3 with repetition according to the at least one random access message 3 repetition parameter. The receiving component 148 may receive a random access message 2 and/or a random access message 4.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

FIG. 10 is a block diagram of an example apparatus 1000 for wireless communication. The apparatus 1000 may be a base station or a base station may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 4-6. Additionally or alternatively, the apparatus 1000 may be configured to perform one or more processes described herein, such as method 800 of FIG. 8. In some aspects, the apparatus 1000 may include one or more components of the base station described above in connection with FIG. 1.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 1.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 1. In some aspects, the transmission component 1006 may be collocated with the reception component 1002 in a transceiver.

The communication manager 1004 may receive a random access preamble with coverage enhancement; transmit a random access message 2; determine at least one random access message 3 repetition parameter based on at least one property of the random access preamble; receive a random access message 3 with repetition according to the at least one random access message 3 repetition parameter; and transmit a random access message 4 In some aspects, the communication manager 904 may include a controller/processor, a memory, a scheduler, a communication unit, or a combination thereof, of the base station described above in connection with FIG. 1.

In some aspects, the communication manager 1004 may include a set of components, such as a preamble receiving component 122, a repetition parameter component 124, a receiving component 126, and a transmitting component 128, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the base station described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The preamble receiving component 122 may receive a random access preamble with coverage enhancement. The repetition parameter component 124 may determine at least one random access message 3 repetition parameter based on at least one property of the random access preamble. The receiving component 126 may receive a random access message 3 with repetition according to the at least one random access message 3 repetition parameter. The transmitting component 128 may transmit the random access message 2 and/or the random access message 4.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 1.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following provides an overview of aspects of the present disclosure:

Aspect 1: A method of wireless communication for a user equipment (UE), including: transmitting a random access preamble with coverage enhancement; receiving a random access message 2; determining at least one random access message 3 repetition parameter based on at least one property of the random access preamble; transmitting a random access message 3 with repetition according to the at least one random access message 3 repetition parameter; and receiving a random access message 4.

Aspect 2: The method of Aspect 1, wherein determining the at least one random access message 3 repetition parameter includes: determining to apply repetition of the random access message 3 in response to the random access preamble being repeated.

Aspect 3: The method of any of Aspects 1 or 2, wherein determining the at least one random access message 3 repetition parameter includes: determining to apply repetition of the random access message 3 based on a format of the random access preamble.

Aspect 4: The method of any of Aspects 1-3, wherein the format of the random access preamble is a coverage enhanced format.

Aspect 5: The method of any of Aspects 1-4, wherein determining the at least one random access message 3 repetition parameter includes determining to apply repetition of the random access message 3 in response to the random access preamble including one of a configured subset of preamble sequences.

Aspect 6: The method of any of Aspects 1-5, further including receiving system information indicating that repetition of message 3 is based on the at least one property of the random access preamble.

Aspect 7: The method of any of Aspects 1-6, wherein the random access message 2 indicates that repetition of message 3 is based on the at least one property of the random access preamble.

Aspect 8: The method of any of Aspects 1-7, wherein determining the at least one random access message 3 repetition parameter includes determining a number of repetitions according to a rule.

Aspect 9: The method of any of Aspects 1-8, wherein the rule is defined in system information.

Aspect 10: The method of any of Aspects 1-9, wherein determining the at least one random access message 3 repetition parameter includes interpreting a field of the random access message 2 as an indication of the at least one random access message 3 repetition parameter in response to transmitting the random access preamble with coverage enhancement.

Aspect 11: A method of wireless communication at a base station, including: receiving a random access preamble with coverage enhancement; transmitting a random access message 2; determining at least one random access message 3 repetition parameter based on at least one property of the random access preamble; receiving a random access message 3 with repetition according to the at least one random access message 3 repetition parameter; and transmitting a random access message 4.

Aspect 12: The method of Aspect 11, wherein determining the at least one random access message 3 repetition parameter includes: determining that the random access message 3 is repeated in response to the random access preamble being repeated.

Aspect 13: The method of any of Aspects 11 or 12, wherein determining the at least one random access message 3 repetition parameter includes: determining that the random access message 3 is repeated based on a format of the random access preamble.

Aspect 14: The method of any of Aspects 11-13, wherein the format of the random access preamble is a coverage enhanced format.

Aspect 15: The method of any of Aspects 11-14, wherein determining the at least one random access message 3 repetition parameter includes: determining that the random access message 3 is repeated in response to the random access preamble including one of a configured subset of preamble sequences.

Aspect 16: The method of any of Aspects 11-15, further including transmitting system information indicating that repetition of message 3 is based on the at least one property of the random access preamble.

Aspect 17: The method of any of Aspects 11-16, wherein the random access message 2 indicates that repetition of message 3 is based on the at least one property of the random access preamble.

Aspect 18: The method of any of Aspects 11-17, wherein determining the at least one random access message 3 repetition parameter includes determining a number of repetitions according to a rule.

Aspect 19: The method of any of Aspects 11-18, wherein the rule is defined in system information.

Aspect 20: The method of any of Aspects 11-19, wherein determining the at least one random access message 3 repetition parameter includes setting a field of the random access message 2 as an indication of the at least one random access message 3 repetition parameter in response to receiving the random access preamble with coverage enhancement.

Aspect 21: An apparatus for wireless communication, including: a processor; and a memory coupled with the processor, wherein the memory includes instructions executable by the processor to cause the apparatus to perform each of the steps of any one of the method claims 1-10.

Aspect 22: An apparatus for wireless communication, including: means for performing the method of any of Aspects 1-10.

Aspect 23: A non-transitory computer-readable medium storing computer executable code, the code when executed by a processor causes the processor to perform the method of any of Aspects 1-10.

Aspect 24: An apparatus for wireless communication, including: a processor; and a memory coupled with the processor, wherein the memory includes instructions executable by the processor to cause the apparatus to perform each of the steps of any one of the method claims 11-20.

Aspect 25: An apparatus for wireless communication, including: means for performing the method of any of Aspects 11-20.

Aspect 26: A non-transitory computer-readable medium storing computer executable code, the code when executed by a processor causes the processor to perform the method of any of Aspects 11-20.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
receiving system information indicating that repetition of a random access message 3 is based on at least one property of a random access preamble;
transmitting the random access preamble with coverage enhancement;
receiving a random access message 2;
determining at least one random access message 3 repetition parameter based on the at least one property of the random access preamble;
transmitting the random access message 3 with repetition according to the at least one random access message 3 repetition parameter; and
receiving a random access message 4.

2. The method of claim 1, wherein determining the at least one random access message 3 repetition parameter comprises:
determining to apply repetition of the random access message 3 in response to the random access preamble being repeated.

3. The method of claim 1, wherein determining the at least one random access message 3 repetition parameter comprises:
determining to apply repetition of the random access message 3 based on a format of the random access preamble.

4. The method of claim 3, wherein the format of the random access preamble is a coverage enhanced format.

5. The method of claim 1, wherein determining the at least one random access message 3 repetition parameter comprises:
applying repetition of the random access message 3 in response to the random access preamble including one of a configured subset of preamble sequences.

6. The method of claim 1, wherein the random access message 2 indicates that repetition of message 3 is based on the at least one property of the random access preamble.

7. The method of claim 1, wherein determining the at least one random access message 3 repetition parameter comprises determining a number of repetitions according to a rule.

8. The method of claim 7, wherein the rule is defined in system information.

9. The method of claim 1, wherein determining the at least one random access message 3 repetition parameter comprises interpreting a field of the random access message 2 as an indication of the at least one random access message 3 repetition parameter in response to transmitting the random access preamble with coverage enhancement.

10. A method of wireless communication at a base station, comprising:
transmitting system information indicating that repetition of a random access message 3 is based on at least one property of a random access preamble;
receiving the random access preamble with coverage enhancement;
transmitting a random access message 2;
determining at least one random access message 3 repetition parameter based on the at least one property of the random access preamble;
receiving the random access message 3 with repetition according to the at least one random access message 3 repetition parameter; and
transmitting a random access message 4.

11. The method of claim 10, wherein determining the at least one random access message 3 repetition parameter comprises;
determining that the random access message 3 is repeated in response to the random access preamble being repeated.

12. The method of claim 10, wherein determining the at least one random access message 3 repetition parameter comprises;
determining that the random access message 3 is repeated based on a format of the random access preamble.

13. The method of claim 12, wherein the format of the random access preamble is a coverage enhanced format.

14. The method of claim 10, wherein determining the at least one random access message 3 repetition parameter comprises:
determining that the random access message 3 is repeated in response to the random access preamble including one of a configured subset of preamble sequences.

15. The method of claim 10, wherein the random access message 2 indicates that repetition of message 3 is based on the at least one property of the random access preamble.

16. The method of claim 10, wherein determining the at least one random access message 3 repetition parameter comprises determining a number of repetitions according to a rule.

17. The method of claim 16, wherein the rule is defined in system information.

18. The method of claim 10, wherein determining the at least one random access message 3 repetition parameter comprises setting a field of the random access message 2 as an indication of the at least one random access message 3 repetition parameter in response to receiving the random access preamble with coverage enhancement.

19. An apparatus for wireless communication, comprising:
at least one processor; and
a memory coupled with the at least one processor, wherein the memory includes instructions executable by the at least one processor to cause the apparatus to:
receive system information indicating that repetition of a random access message 3 is based on at least one property of a random access preamble;
transmit the random access preamble with coverage enhancement;
receive a random access message 2;
determine at least one random access message 3 repetition parameter based on the at least one property of the random access preamble;
transmit the random access message 3 with repetition according to the at least one random access message 3 repetition parameter; and
receive a random access message 4.

20. The apparatus of claim 19, wherein the at least one processor is configured to apply repetition of the random access message 3 in response to the random access preamble being repeated.

21. The apparatus of claim 19, wherein the at least one processor is configured to apply repetition of the random access message 3 based on a format of the random access preamble.

22. The apparatus of claim 21, wherein the format of the random access preamble is a coverage enhanced format.

23. The apparatus of claim 19, wherein the at least one processor is configured to apply repetition of the random access message 3 in response to the random access preamble including one of a configured subset of preamble sequences.

24. The apparatus of claim 19, wherein the random access message 2 indicates that repetition of message 3 is based on the at least one property of the random access preamble.

25. The apparatus of claim 19, wherein to determine the at least one random access message 3 repetition parameter, the at least one processor is configured to determine a number of repetitions according to a rule.

26. The apparatus of claim 19, wherein to determine the at least one random access message 3 repetition parameter, the at least one processor is configured to interpret a field of the random access message 2 as an indication of the at least one random access message 3 repetition parameter in response to transmitting the random access preamble with coverage enhancement.

27. An apparatus for wireless communication, comprising:
   at least one processor; and
   a memory coupled with the at least one processor, wherein the memory includes instructions executable by the at least one processor to cause the apparatus to:
      transmit system information indicating that repetition of a random access message 3 is based on at least one property of a random access preamble;
      receive the random access preamble with coverage enhancement;
      transmit a random access message 2;
      determine at least one random access message 3 repetition parameter based on at least one property of the random access preamble;
      receive a random access message 3 with repetition according to the at least one random access message 3 repetition parameter; and
      transmit a random access message 4.

28. An apparatus for wireless communication, comprising:
   at least one processor; and
   a memory coupled with the at least one processor, wherein the memory includes instructions executable by the at least one processor to cause the apparatus to:
      transmit a random access preamble with coverage enhancement;
      receive a random access message 2;
      determine at least one random access message 3 repetition parameter based on at least one property of the random access preamble;
      apply repetition of a random access message 3 in response to the random access preamble including one of a configured subset of preamble sequences;
      transmit the random access message 3 with repetition according to the at least one random access message 3 repetition parameter; and
      receive a random access message 4.

29. An apparatus for wireless communication, comprising:
   at least one processor; and
   a memory coupled with the at least one processor, wherein the memory includes instructions executable by the at least one processor to cause the apparatus to:
      receive a random access preamble with coverage enhancement;
      transmit a random access message 2;
      determine at least one random access message 3 repetition parameter based on at least one property of the random access preamble, wherein to determine the at least one random access message 3 repetition parameter, the at least one processor is configured to determine that a random access message 3 is repeated in response to the random access preamble including one of a configured subset of preamble sequences;
      receive the random access message 3 with repetition according to the at least one random access message 3 repetition parameter; and
      transmit a random access message 4.

* * * * *